US010503163B2

United States Patent
Tian et al.

(10) Patent No.: US 10,503,163 B2
(45) Date of Patent: Dec. 10, 2019

(54) REMOTE CONTROL APPARATUS AND REMOTE CONTROL SYSTEM

(71) Applicant: YUNEEC TECHNOLOGY CO., LIMITED, Hong Kong (CN)

(72) Inventors: Yu Tian, Jiangsu (CN); Wenyan Jiang, Jiangsu (CN)

(73) Assignee: YUNEEC TECHNOLOGY CO., LIMITED, Hong Kong (CN)

( * ) Notice: Subject to any disclaimer, the term of this patent is extended or adjusted under 35 U.S.C. 154(b) by 123 days.

(21) Appl. No.: 15/553,926

(22) PCT Filed: Jul. 1, 2016

(86) PCT No.: PCT/CN2016/088064
§ 371 (c)(1),
(2) Date: Aug. 25, 2017

(87) PCT Pub. No.: WO2017/000907
PCT Pub. Date: Jan. 5, 2017

(65) Prior Publication Data
US 2019/0101912 A1     Apr. 4, 2019

(30) Foreign Application Priority Data

Jul. 1, 2015  (CN) .................... 2015 2 0465249 U

(51) Int. Cl.
*G05D 1/00*     (2006.01)
*A63H 30/04*   (2006.01)
(Continued)

(52) U.S. Cl.
CPC .......... *G05D 1/0016* (2013.01); *A63H 27/12* (2013.01); *A63H 30/04* (2013.01); *G01C 19/48* (2013.01);
(Continued)

(58) Field of Classification Search
CPC .... G05D 1/0016; G05D 1/101; G05D 1/0022; A63H 27/12; A63H 30/04
See application file for complete search history.

(56) References Cited

U.S. PATENT DOCUMENTS 8,226,484 B2 * 7/2012 Bryant .................... A63F 13/24
463/36
8,242,894 B2 * 8/2012 Kutaragi ................ G08C 17/02
340/12.22

(Continued)

FOREIGN PATENT DOCUMENTS

CN  202398111 U  8/2012
CN  203217759 U  9/2013

OTHER PUBLICATIONS

Sumarudin et al.; Flexible and Reconfigurable System on Chip for Wireless Sensor Network; Intl. Conf. on Infromation Tech. Systems and Innovation (ICITSI) 2014; Nov. 24-27, 2014; IEEE; pp. 230-234 (Year: 2014).*

Primary Examiner — Michael J Zanelli

(57) ABSTRACT

A remote control apparatus includes: a main controller, a wireless transmission chip, a gyroscope chip and an operating device; wherein the wireless transmission chip is electrically connected with the main controller; the gyroscope chip is electrically connected with the main controller; the operating device is electrically connected with the main controller. The gyroscope chip is used for detecting an inclination angle of the remote control apparatus relative to a horizontal plane, and sending a first electric signal representing a positioning status of the remote control apparatus to the main controller. The main controller is used for detecting an input level when the operating device is operated by an operator, and sending a second electric signal representing a movement direction instructed by the operating device to the wireless transmission chip. The wireless (Continued)

transmission chip transmits the second electric signal to an external device.

15 Claims, 1 Drawing Sheet

(51) Int. Cl.
    *G08C 17/02*           (2006.01)
    *A63H 27/00*           (2006.01)
    *G01C 19/48*           (2006.01)
    *G05D 1/10*            (2006.01)

(52) U.S. Cl.
    CPC ........... *G05D 1/0022* (2013.01); *G05D 1/101* (2013.01); *G08C 17/02* (2013.01); *G08C 2201/32* (2013.01)

(56) References Cited

U.S. PATENT DOCUMENTS

| | | | | |
|---|---|---|---|---|
| 2014/0008496 A1* | 1/2014 | Ye | ............................ | B64C 13/20 244/190 |
| 2014/0099853 A1* | 4/2014 | Condon | ............... | G05D 1/0033 446/37 |
| 2016/0306349 A1* | 10/2016 | Lau | ....................... | G05D 1/0016 |
| 2018/0264972 A1* | 9/2018 | Pang | .................... | A63C 17/011 |

* cited by examiner

REMOTE CONTROL APPARATUS AND REMOTE CONTROL SYSTEM

CROSS REFERENCE OF RELATED APPLICATION

This is a U.S. National Stage under 35 U.S.C 371 of the International Application PCT/CN2016/088064, filed Jul. 1, 2016, which claims priority under 35 U.S.C. 119(a-d) to CN 201520465249.X, filed Jul. 1, 2015.

BACKGROUND OF THE PRESENT INVENTION

Field of Invention

The present invention relates to the technical field of a remote control apparatus and a remote control system.

Description of Related Arts

Currently on the market, unmanned model aircrafts, such as fixed-wing aircraft and rotary-wing aircraft including helicopter, are widely applied in various fields including detection, search and rescue, model aircraft entertainment, wedding day shooting and etc.

The aircrafts are usually manipulated via a terminal remote control apparatus which is also called remote control apparatus by users. In the conventional arts, when a controller remotely controls aircrafts, multiple operating devices are provided to achieve controlling multiple movement operations of the aircrafts. However, the manner of remotely controlling by multiple operating devices will increase the structural complexity and control complexity, and thus the conventional remote control apparatuses need urgent improvement.

SUMMARY OF THE PRESENT INVENTION

A technical problem to be solved by the present invention is to overcome the drawbacks of the structural complexity and control complexity of the remote control apparatus while remotely controlling the external device by multiple operating devices, and provide a remote control apparatus and remote control system.

In order to solve the technical problems mentioned above, the present invention provides technical solutions as follows.

A remote control apparatus is characterized in comprising: a main controller, a wireless transmission chip, a gyroscope chip and an operating device; wherein the wireless transmission chip is electrically connected with the main controller; the gyroscope chip is electrically connected with the main controller; the operating device is electrically connected with the main controller; the gyroscope chip is used for detecting an inclination angle of the remote control apparatus relative to a horizontal plane, and sending a first electric signal representing a positioning status of the remote control apparatus to the main controller; the main controller is used for detecting an input level when the operating device is operated, and sending a second electric signal representing a movement direction instructed by the operating device to the wireless transmission chip; the wireless transmission chip is for transmitting the second electric signal to an external device.

The gyroscope chip is utilized to detect the inclination angle of the remote control apparatus, so as to obtain the current displacement status of the remote control apparatus. In addition, by different displacement status of the remote control device, the operating device triggers to indicate corresponding movement directions of the external device. Compared with the conventional structures remotely controlling via multiple operating devices, the present invention by means of the remote control apparatus and the remote control system, controlling movement in multiple directions of an external device can be implemented by using only one operating device, which simplifies an internal structure of the remote control apparatus, and also improves convenience in controlling the external device.

Preferably, the device comprises four keys, and the four keys are all connected with the main controller.

Each of the four keys is capable of triggering the external device to move on a certain direction, so as to further increase the movement direction variousness of controlling the external device. In addition, an amount of the keys are not limited to four, and can be set according requirements of the controlling directions.

Preferably, the four keys are respectively provided on up, down, left and right directions of a plane on which the remote control apparatus is provided.

Preferably, the operating device is a rocker bar, wherein the rocker bar is capable of further simplifying an internal structure of the remote control apparatus.

Preferably, the wireless transmission chip is connected with the main controller via a USART (Universal Synchronous/Asynchronous Receiver/Transmitter) serial port.

Preferably, the gyroscope chip is connected with the main controller via I2C (Inter-Integrated Circuit) bus, wherein the I2C bus is a two-wire serial bus.

The present invention further provides a remote control system, comprises the remote control apparatus mentioned above and the external device mentioned above; wherein the external device performs operations after receiving the second electric signal.

Preferably, the external device is an aircraft. The external device can also be other navigational equipments in the air, the land or the sea, as long as the movement thereof can be controlled by remote control apparatus.

Preferably, when the remote control apparatus is in a tilting status, the four keys are respectively used for controlling the external device to fly upward or downward, to fly left or right on the plane on which the external device is provided.

Preferably, when the remote control apparatus is in a tilting status, the four keys are respectively used for controlling the external device to fly upward or downward, to fly left or right on the plane on which the external device is provided.

The present invention utilizes the gyroscope chip to detect the inclination angle of the remote control apparatus, so as to obtain the current displacement status of the remote control apparatus. In addition, by different displacement statuses of the remote control device, the operating device triggers to indicate corresponding movement directions of the external device. Compared with the conventional structures remotely controlling via multiple operating devices, the present invention by means of the remote control apparatus and the remote control system, controlling movement in multiple directions of an external device can be implemented by using only one operating device, which simplifies an internal structure of the remote control apparatus, and also improves convenience in controlling the external device.

DETAILED DESCRIPTION OF THE PREFERRED EMBODIMENT

Embodiment 1

Figure 1:
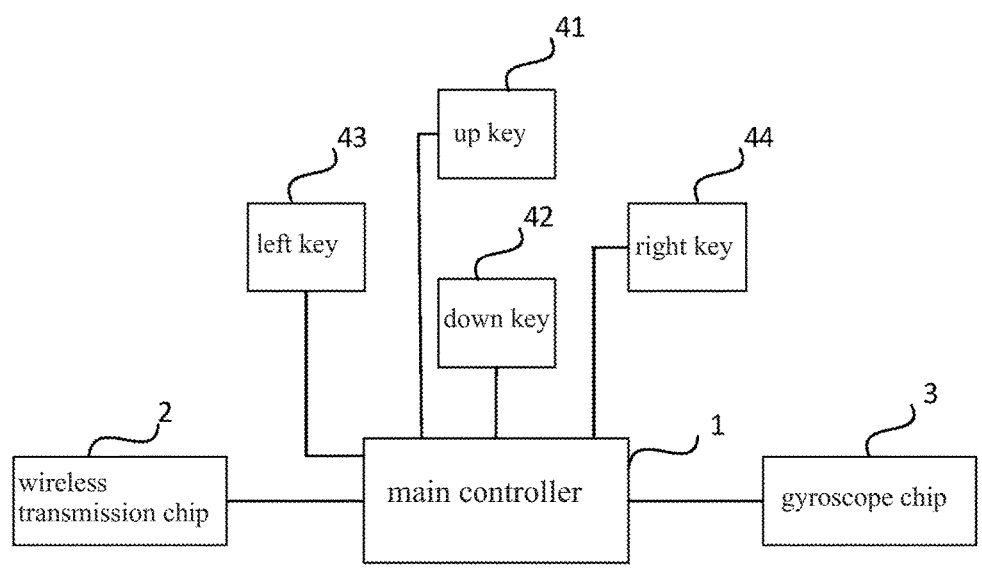
FIG. 1 is a structural schematic view of a remote control apparatus according to an Embodiment 1 of the present invention.

The embodiment 1 provides a remote control apparatus for controlling movements of an aircraft. As shown in the FIG. 1, the remote control apparatus comprises: a main controller 1, a wireless transmission chip 2, a gyroscope chip 3 and an operating device; wherein the wireless transmission chip 2 is connected with the main controller 1 via a USART serial port, the gyroscope chip 3 is connected with the main controller 1 via I2C bus, the operating device is electrically connected with the main controller.

The operating device mentioned above comprises four keys 41, 42, 43 and 44, i.e., an up key 41, a down key 42, a left key 43 and a right key 44, which are all electrically connected with the main controller. The up key 41, the down key 42, the left key 43 and the right key 44 are respectively provided on up, low, left and right directions of a plane on which the remote control apparatus is provided. The up key 41, the down key 42, the left key 43 and the right key 44 are used for controlling different movement direction of an airplane when the remote control apparatus is in different placement state. An amount of the keys is not limited to 4, can be 6, 8 and etc. as well. The gyroscope chip is used for detecting an inclination angle of the remote control apparatus relative to a horizontal plane, and sending a first electric signal representing a positioning status of the remote control apparatus to the main controller.

The positioning status of the remote control apparatus can be defined according to a size of the inclination angle; e.g. when the inclination angle is within 15 degrees, the positioning status of the remote control apparatus is defined as a flat status; when the inclination angle is at a range of 15-60 degrees, the positioning status of the remote control apparatus is defined as a tilting status; when the inclination angle is at a range of 60-90 degrees, the positioning status of the remote control apparatus is defined as an upright status, wherein the defining manner is not limited to this. However, in the preferred embodiment, two statuses are defined; i.e., when the inclination angle is within 45 degrees, the positioning status of the remote control apparatus is defined as a flat status; and when the inclination angle is at a range of 45-90 degrees, the positioning status of the remote control apparatus is defined as a tilting status.

When the remote control apparatus is in a flat status, the up key 41, the down key 42, the left key 43 and the right key 44 respectively control the aircraft to fly forward, fly backward, fly left and fly right on the plane on which the aircraft is provided. When the remote control apparatus is in a tilting status, the up key 41, the down key 42, the left key 43 and the right key 44 respectively control the aircraft to fly forward, fly backward, fly left and fly right on the plane on which the aircraft is provided.

However, the control relationship is not limited to this. Moving directions of the aircraft can be controlled combined by the displacement condition of the remote control apparatus and the control function of the keys.

When the inclination angle of the remote control apparatus is less than 45 degrees, the remote control apparatus is in a flat status. When the left key is pressed the main controller detects that an input level on an I/O port of the main controller, on which the left key is electrically connected, is a high level. After receiving the first electric signal sent by the gyroscope chip and presenting that the remote control apparatus is in a flat status, the main controller sends a second electric signal for representing an indicating movement direction of the operating device to the wireless transmission chip. The wireless transmission chip sends the second electric signal to the aircraft, and the aircraft flies left after receiving the second electric signal, wherein a flying distance and rate can be set in the main controller.

In addition, the operating device can also be embodied as a rocker bar, wherein a moving direction of the rocker bar is corresponding to a providing direction of the keys, a trigging principle thereof is similar to the keys; e.g., the rocker bar moves left, the main controller detects that a level in an I/O port is a high level, the main controller sends a second electric signal to the wireless transmission chip, the aircraft performs corresponding movements in the displacement status of the remote control apparatus, such as moving left, or flying left One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A remote control apparatus, comprising: a main controller, a wireless transmission chip, a gyroscope chip and an operating device; wherein the wireless transmission chip is electrically connected with the main controller; the gyroscope chip is electrically connected with the main controller; the operating device is electrically connected with the main controller; the gyroscope chip is used for detecting an inclination angle of the remote control apparatus relative to a horizontal plane, and sending a first electric signal representing a positioning status of the remote control apparatus to the main controller; the main controller is used for detecting an input level when the operating device is operated, and sending a second electric signal representing a movement direction instructed by the operating device to the wireless transmission chip; the wireless transmission chip is for transmitting the second electric signal to an external device;

wherein the operating device comprises four keys, and the four keys are all connected with the main controller.

2. The remote control apparatus, as recited in claim 1, wherein the four keys are respectively provided on up, down, left and right directions of a plane on which the remote control apparatus is provided.

3. The remote control apparatus, as recited in claim 2, wherein when the remote control apparatus is in a flat status, the four keys are respectively used for controlling the external device to fly forward, backward, left and right on a plane on which the external device is provided.

4. The remote control apparatus, as recited in claim 3, wherein when the remote control apparatus is in a tilting status, the four keys are respectively used for controlling the external device to fly upward or downward, to fly left or right on the plane on which the external device is provided, wherein when the inclination angle is within 45 degrees, the positioning status of the remote control apparatus is defined as a flat status.

5. The remote control apparatus, as recited in claim 4, wherein the operating device is a rocker bar.

6. The remote control apparatus, as recited in claim 1, wherein when the remote control apparatus is in a flat status, the four keys are respectively used for controlling the external device to fly forward, backward, left and right on a plane on which the external device is provided.

7. The remote control apparatus, as recited in claim 1, wherein when the remote control apparatus is in a tilting status, the four keys are respectively used for controlling the external device to fly upward or downward, to fly left or right on the plane on which the external device is provided, wherein when the inclination angle is at a range of 45-90 degrees, the positioning status of the remote control apparatus is defined as a tilting status.

8. The remote control apparatus, as recited in claim 1, wherein the operating device is a rocker bar.

9. The remote control apparatus, as recited in claim 8, wherein moving directions of the rocker bar comprise an up direction, a down direction, a left direction and a right direction.

10. The remote control apparatus, as recited in claim 9, wherein the wireless transmission chip is connected with the main controller via a USART serial port.

11. The remote control apparatus, as recited in claim 10, wherein the gyroscope chip is connected with the main controller via I2C bus.

12. The remote control apparatus, as recited in claim 1, wherein the wireless transmission chip is connected with the main controller via a USART serial port.

13. The remote control apparatus, as recited in claim 1, wherein the gyroscope chip is connected with the main controller via I2C bus.

14. A remote control system, comprising the remote control apparatus as recite in claim 1 and an external device; wherein the external device performs operations after receiving the second electric signal.

15. The remote control system, as recited in claim 14, wherein the external device is an aircraft.

* * * * *